US006188839B1

(12) United States Patent
Pennella

(10) Patent No.: US 6,188,839 B1
(45) Date of Patent: *Feb. 13, 2001

(54) RADIANT FLOOR HEATING SYSTEM WITH REFLECTIVE LAYER AND HONEYCOMB PANEL

(76) Inventor: Ronald J. Pennella, 77 Tamarack Rd., Rye Brook, NY (US) 10573

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/898,225

(22) Filed: Jul. 22, 1997

(51) Int. Cl.[7] ..................................................... F24D 13/02
(52) U.S. Cl. ........................................... 392/435; 428/116
(58) Field of Search ..................................... 392/435, 436, 392/432; 219/213; 237/69; 428/116–117, 118

(56) References Cited

U.S. PATENT DOCUMENTS

| | | | |
|---|---|---|---|
| 2,512,875 | * | 6/1950 | Reynolds ............................. 392/435 |
| 2,556,470 | * | 6/1951 | Del Mar ............................... 428/116 |
| 2,634,361 | * | 4/1953 | Reynolds ............................. 392/435 |
| 4,032,751 | * | 6/1977 | Youtsey et al. ..................... 392/435 |
| 4,167,598 | * | 9/1979 | Logan et al. ........................ 428/116 |
| 4,310,745 | * | 1/1982 | Bender ................................ 219/213 |
| 4,743,740 | * | 5/1988 | Adee ................................... 428/116 |
| 4,878,332 | | 11/1989 | Drake .................................. 52/741 |
| 4,990,744 | | 2/1991 | Willner ................................ 219/213 |
| 5,004,895 | | 4/1991 | Nishino et al. ..................... 219/528 |
| 5,006,391 | * | 4/1991 | Biersach ............................. 428/116 |
| 5,061,541 | * | 10/1991 | Gertel ................................. 428/116 |
| 5,461,213 | | 10/1995 | Rodin ................................. 219/213 |
| 5,532,039 | * | 7/1996 | Payne et al. ........................ 428/116 |
| 5,635,273 | * | 6/1997 | Dixon et al. ........................ 428/116 |
| 5,714,226 | * | 2/1998 | Disselbeck ......................... 428/116 |
| 5,879,780 | * | 3/1999 | Kindinger et al. ................. 428/116 |
| 5,888,613 | * | 3/1999 | Ketcham et al. ................... 428/116 |

FOREIGN PATENT DOCUMENTS

| | | | |
|---|---|---|---|
| 2807970 | * | 8/1979 | (DE) . |
| 3613033 | * | 10/1987 | (DE) ................................... 219/213 |
| 4136019 | * | 5/1992 | (DE) ................................... 219/213 |
| 486891 | * | 5/1992 | (EP) ................................... 219/213 |
| 2572617 | * | 5/1986 | (FR) . |
| 61-47086 | * | 3/1986 | (JP) . |
| 6-146208 | * | 5/1994 | (JP) . |
| 6-302374 | * | 10/1994 | (JP) . |
| 8-64351 | * | 3/1996 | (JP) . |
| 9-170768 | * | 6/1997 | (JP) . |

* cited by examiner

Primary Examiner—Teresa Walberg
Assistant Examiner—Quang Van
(74) Attorney, Agent, or Firm—Sofer & Haroun, LLP

(57) ABSTRACT

A radiant floor heating system and method of installation is provided, the system of the present invention being disposed within a solidified cement or under board. A panel member having a laminated reflective material which serves as a thermal break is placed upon the hardened cement or under board. The panel member may be comprised of any substance to which the reflective material may be secured such as a honeycombed plastic panel to which the reflective material layer is laminated. A heating element is disposed on the reflective material. Thereafter, both the heating element and the reflective layer are coated with a layer of thin set or cement. The heating element may include a heated wire element which is unwound off a roll, or the heating element may be meshed within a web of material which is cut to match the dimensions of the floor and then disposed on top of the reflective layer. After the thin set or cement dries with the heating element embedded within, marble or other types of tiles may be laid as flooring.

6 Claims, 3 Drawing Sheets

RADIANT FLOOR HEATING SYSTEM WITH REFLECTIVE LAYER AND HONEYCOMB PANEL

FIELD OF THE INVENTION

This invention relates to a floor heating system and method of installation and more specifically, to a system which utilizes a thermal barrier having an attached reflective material for directing heat upwards from beneath a floor heating element so as to increase the efficiency of a heating system.

BACKGROUND OF THE INVENTION

In heating the interiors of buildings and of building floors, several conventional heating methods have been employed, including hot water/steam and forced air heating. Generally, these heating methods require the installation of large air ducts or extensive water piping, both of which take up a considerable amount of space within a building and require careful planning for locations of vent, radiators and so forth. Vents and ducts tend to obstruct living and working areas within a building and require other components of the building (ceilings, walls, etc.) to be designed around them. Some hot water systems include piping which is embedded in a flooring or ceiling material through which warm water is circulated to heat a building. In some geographic localities, however, electrical power is cheaper than gas, and direct electric heating is desired.

Electric heating cables have been employed to heat cement slabs and the like by being positioned in a layer beneath the slabs. High limit switches have been employed adjacent the cables to sense the cable temperatures and to prevent the cables from over heating. Temperature sensors imbedded in the concrete slabs regulate the electric current supplied to the heating cable, thereby regulating room heat by controlling the temperature of the concrete where the electric heating cables are embedded. Positioning the temperature sensors in the room air space above the flooring results in prohibitively long response times.

Other systems have been proposed for positioning under stone or ceramic tile, carpet, linoleum and the like for heating the covered floor area. When used with tile, the systems are applied directly onto the substrate or subfloor. These systems suffer many deficiencies. For example, the prior art systems as discussed below are expensive to install, difficult to maintain and/or have many safety problems.

U.S. Pat. No. 5,461,213 to Rodin discloses a heated floor construction which includes a supporting structure or an existing floor construction having a number of components of sheet material, at least one electric heating cable and a device for regulation of the heat dissipation of the heating cable. The heating cable is disposed in at least one channel between the different sheet components. This reference does not disclose a system which utilizes a panel member having a reflective barrier layer for reflecting heat generated by a heating element away from the sub-floor and toward the flooring.

U.S. Pat. No. 5,004,895 to Nishino et al. relates to a heater device used for a flow material with a heater contained therein, the heater device having an insulating sheet, a plurality of belt shaped electrodes, a plastic radiant body and an insulating layer formed on an upper surface of the radiant body layer. This reference does not disclose a system which utilizes a panel member having a reflective barrier layer for reflecting heat generated by a heating element away from the sub-floor and toward the flooring.

U.S. Pat. No. 4,990,744 to Willner provides for an underfloor covering heating system for positioning below a floor covering a system including a heat conducting substrate within which is positioned solid conductor resistance heating wires in a serpentine manner for heating the substrate. This reference does not disclose a system which utilizes a panel member having a reflective barrier layer for reflecting heat generated by a heating element away from the sub-floor and toward the flooring.

U.S. Pat. No. 4,878,332 to Drake discloses an electric radiant heating system having an electric resistance heating cable embedded in a cementious thermal mass for transferring thermal energy to the thermal mass when an electric current is applied to the cable. This reference does not disclose a system which utilizes a panel member having a reflective barrier layer for reflecting heat generated by a heating element away from the sub-floor and toward the flooring.

OBJECTS AND SUMMARY OF THE INVENTION

The preferred embodiment is designed for use beneath the flooring of marble-tiled bathrooms of residential apartments or homes. When apartments in apartment buildings are built upon one another, at least one (1) or more feet of cement or under board separate the ceiling of one apartment and the floor of the apartment above it. After the foundation of the apartments have solidified, the components of the floor heating system of the present invention are disposed upon the solidified cement or under board. A panel member or thermal barrier is first placed upon the hardened cement or under board. The reflective layer may be comprised of any substance to which the reflective material may be secured. In a preferred embodiment, the panel member is a honeycombed plastic panel to which the reflective material layer is secured to. A heating element is secured on to the reflective layer and then coated with a layer of wet thin set or self-leveling cement or any type of cement product. The heating element may include a heated wire element which is unwound off a roll and disposed on the reflective material layer, or the heating element may be meshed within a web of material which is cut to match the dimensions of the floor and then disposed on top of the reflective material layer. Thereafter the reflective material layer and the heating element is coated with a layer of wet thin set or self-leveling cement. After the thin set or cement dries with the heating element embedded within, marble, limestone, ceramic, wood or other types of tiles or flooring may be laid as flooring.

Without the inclusion of a panel member and reflective surface, the heat which emanates from the heating element disposed within the layer of thin set or cement, emanates upward to heat the floor, but also disperses downward throughout the entire one or more feet of flooring cement or under board. As such, a substantial amount of heat is wasted. The inclusion of the reflective surface serves to direct the heat from the heating element upward and prevents dispersal (and hence waste) of the heat below the reflective surface. The inclusion of the panel member serves to provide an additional rigid insulative layer that is easily fit in place. The added advantage of such a rigid insulative layer is that by providing a honeycombed structure, an insulative air gap between the concrete floor and the heating element is provided.

Although the preferred embodiment is directed towards use in bathrooms, the invention is not limited in this respect, and the heating system and panel member with reflective surface of the present invention may also be installed beneath the floors or within the walls of other rooms in one's home, as well as beneath sidewalks, driveways, and loading docks among other places.

Accordingly, it is an object of the invention to provide a floor heating system and a method of installation, which utilizes a thermal panel member having an attached reflective material for directing heat upwards from beneath a floor so as raise the temperature of a cold floor to a suitable temperature.

A further object of the invention is to provide a honeycombed plastic panel with a reflective material layer laminated to it upon which a heating element and a layer of wet thin set or self-leveling cement may be applied.

An additional object of the invention is to provide a reflective surface layer that reflects heat from a heating element upwards toward the flooring material thus preventing dispersal of heat below the reflective surface.

BRIEF DESCRIPTION OF THE DRAWINGS

The preferred embodiment of the invention will be explained in further detail and in reference to the drawings, in which.

DETAILED DESCRIPTION OF THE PRESENTLY PREFERRED EMBODIMENTS

Figure 1:
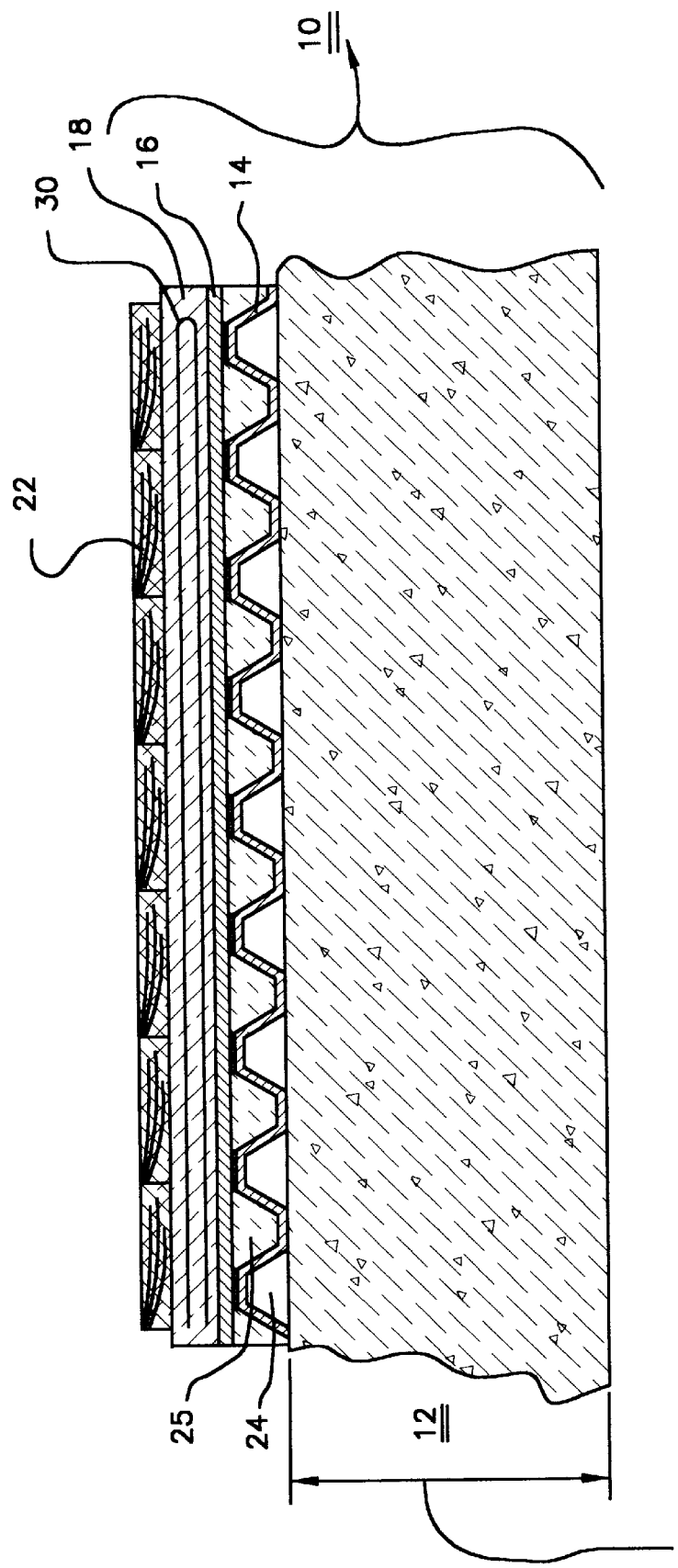
FIG. 1 shows a section through a floor according to the invention with a reflective surface and a panel member.

With initial reference to FIG. 1, a radiant floor heating system 10 and method of installation as installed on a sub-flooring 12 is shown and provided. The radiant floor heating system 10 is provided with a barrier or panel member 14 on which a reflective surface 16 is mounted. A heating element 30 is secured to the reflective surface 16 and then coated with a layer of wet thin set or self-leveling cement 18. In this way, the heating element 30 is imbedded within the self-leveling cement 18. After the self leveling cement 18 dries with the heating element embedded within, flooring tiles 22 may be laid as flooring.

Figure 2:
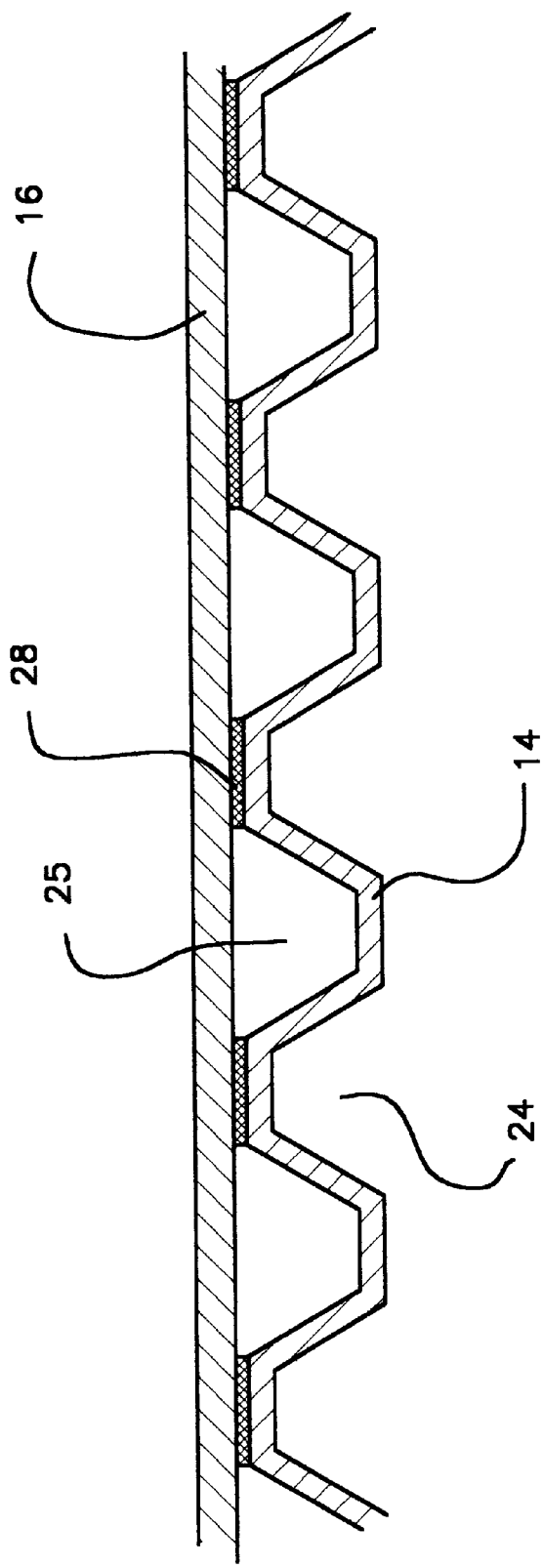
FIG. 2 shows a section through the reflective surface and panel member.

As shown in FIG. 2, the panel member 14 is shown bonded to reflective surface 16. With specific reference to the panel member 14, panel member 14 comprises a honeycombed plastic panel such as a NorCore brand horizontal flooring as manufactured by the Norfield Corporation of Danbury, Conn. The horizontal flooring provides a high strength to weight ratio such physical properties are shown in the chart below:

| Physical Properties | |
|---|---|
| Property | 1" NorCore Material |
| Nominal Weight, psf | 0.78–1.10 |
| Flexural Strength, psi | 350–1,220 |
| Flexural Modulus, psi | — |
| Compressive Strength, psi | 140–510 |
| Water Absorption, % bw | 0.035–1.50 |
| Thermal Resistance, hr. S.f. F/BTU | 1.33–1.50 |
| Sound Transmission Loss, Db | 5–19 |

| -continued | |
|---|---|
| Physical Properties | |
| Property | 1" NorCore Material |
| Impact Resistance, Deflection, in. | 0.22–0.28 |
| Fire Resistance | UL-94VO |

In addition to numerous structural properties the honeycombed panel 14 provides, such a panel 14 has the following advantages in that it is impact resistant, warp resistant, moisture and corrosion resistant, as well as having high thermal and acoustical characteristics. Standard sheet sizes as provided by the manufacturer includes 4'×8', 4'×10', 5'×8' and 5'×10' sheets. Thicknesses of such sheets range from ¼ inch to 3 inches. As presently contemplated, a sheet having a thickness of ½ inch is preferred. In one embodiment, honeycombed panel 14 is a divided structure having lower pockets 24 and upper pockets 25. Lower pockets 24, upper pockets 25, or both pockets 24 and 25 may be filled with a variety of insulative material including, but not limited to, air.

Figure 3:
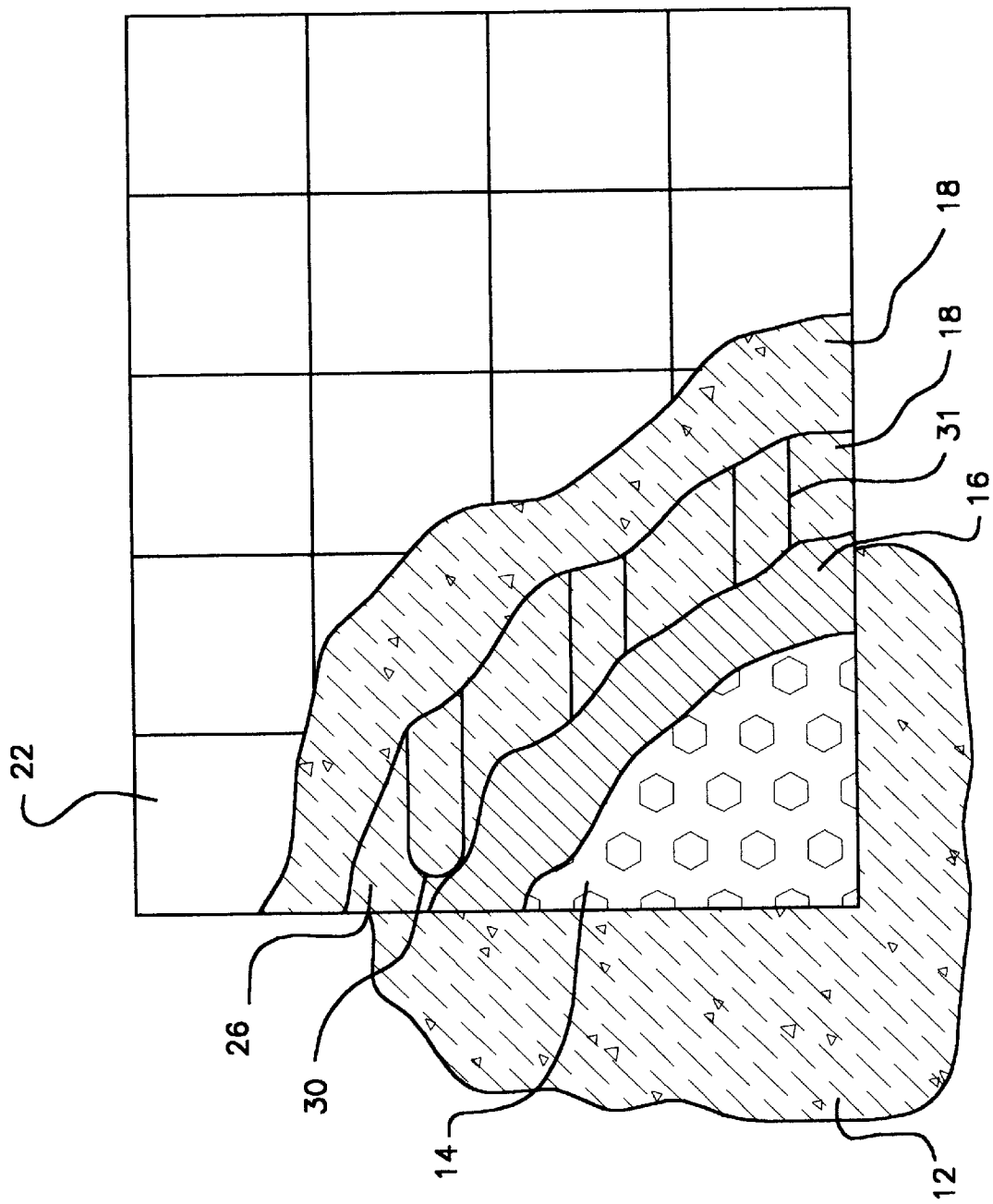
FIG. 3 shows a top elevation cut away of the lay-out of the floor according to the invention.

With reference to FIGS. 1 and 3, heating element 30 may be a roll product as manufactured by Domo Teck of Streamwood, Ill. and sold under the brand name WarmTouch TF 2000 S underfloor heating. The WarmTouch heating element or any suitable heating element may be secured directly to the reflective layer and is supplied in rolls of mesh fabric 26 in which a wire heating element 30 is embedded. The heating wire element 30 and mesh fabric 26 may be easily adapted to any floor layout or around any obstacle. Such heating elements 30 consume approximately 10 to 15 watts of electricity per square foot. It should be noted that although the heating element 30 described above is a Warm Touch brand heating element, it should be noted that any heating element that may be embedded with the self leveling cement may be utilized, the invention not being limited to any particular type or brand of heating element. As a further example, the present invention may be utilized with circulating hot water piped systems.

The panel member 14, which has a honeycombed structure provides a thermal break between the subfloor 12, which may be concrete, under board, cement or even plywood. In this way and by providing air pockets 24, an additional insulation layer is provided. Accordingly, the heat which emanates from the heating element 30 disposed within the layer of thin-set or self-leveling cement 18 emanates upward to heat the floor, but also is not dispersed downward through the entire sub-floor 12. Reflective surface 16 has a polished and shiny surface which serves to direct the heat from the heating element 30 upward and prevents dispersal of the heat below the panel member. It should be noted that although the panel member described above is a NorCore brand panel member, any panel member that provides sufficient structural integrity and that provides an insulative layer may be utilized, the invention not being limited to any particular type or brand of panel member.

As shown in FIG. 3 which shows a cut away of the radiant floor heating system, the method of installing the aforementioned radiant floor heating system will be now described. After the concrete foundation 12 of the apartments has solidified, the components of the floor heating system 10 of the present invention are disposed upon the subfloor 12. The panel member 14 having the reflective surface 16 which serves as a thermal break is first placed upon the sub-floor 12. The panel member 14 may be comprised of any substance which provides an insulating layer and that which the reflective surface 16 may be secured to. In a preferred embodiment, the panel member 14 comprises a honeycombed plastic panel sold under the brand name NorCore, to which the reflective surface 16 is mounted. The reflective surface 16 may be bonded to the panel member 14 by any known glue, adhesive or contact cement 28. The heating element 30 is then secured to the top of the reflective surface 16. Then both the heating element 30 and the reflective surface 16 are coated with a layer of wet thin set or self-leveling cement 18.

The heating element 30, such as that manufactured by DomoTeck, Inc. may include a heated wire strand 31. The heating element 30 may be supplied as a coiled roll and then rolled out on the wet thin set or cement. The heated wire stand 31 may also be embedded within a mesh of material 26 which is unrolled and cut to match the dimensions of the floor and then disposed on top of the reflective surface 16. Thereafter, thin set or cement 18 is applied to both the heating element 30 and the reflective layer 16. Marble or other types of tiles or flooring 22 may be laid as flooring within the thin set or cement 18.

With the inclusion of the reflective surface 16, the heat which emanates from the heating element 30 secured on the reflective surface 30 and within the layer of thin set or cement 18, emanates upward to heat the floor, but is also not dispersed downward throughout the entire one or more feet of flooring cement or under board 12. The inclusion of the panel member 14 also serves to provide an additional rigid insulative layer that is easily fit in place. The added advantage of such a rigid insulative layer is that by providing a honeycombed structure, an insulative air gap 24 which provides a thermal break between the concrete floor 12 and the heating element 30 is provided.

It should be understood that the preferred embodiments and examples described are for illustrative purposes only and are not to be construed as limiting the scope of the present invention which is properly delineated only in the appended claims.

What is claimed is:

1. A radiant floor heating system installed on a sub-floor, said radiant floor heating system comprising:

a solid, rigid, continuous honeycomb panel sheet having a top and bottom surface and forming a plurality of air insulating pockets alternatively disposed on said top and bottom surfaces, said honeycomb sheet is a plastic substrate with a high strength to weight ratio;

a reflective layer disposed on said top surface of said honeycomb panel sheet;

a heating element positioned on said reflective layer so that when said heating element is activated, heat generated from said heating element is reflected away from said honeycomb panel sheets;

a flooring covering material; and a bonding layer positioned on said heating element, whereby said flooring covering material is embedded within said bonding layer and positioned over said heating element.

2. The radiant floor heating system of claim 1, wherein said reflective layer is an aluminum sheet material.

3. The radiant floor heating system of claim 2, wherein said reflective layer is bonded to said honeycomb panel sheet with a bonding agent.

4. The radiant floor heating system of claim 1, wherein said sub-floor is a concrete material.

5. The radiant floor heating system of claim 2, wherein said bonding layer is cement.

6. A method of installing a radiant floor heating system on a sub-floor, said method comprising the steps of:

disposing a solid, rigid, continuous honeycomb panel sheet having a top and bottom surface and forming a plurality of air insulating pockets alternatively disposed on said top and bottom surfaces and a reflective layer on said top surface of said honeycomb panel sheet, said honeycomb sheet is a plastic substrate with a high strength to weight ratio;

positioning a heating element on said reflective layer so that when said heating element is activated, heat generated from said heating element is reflected away from said honeycomb panel sheet;

providing a layer of cement on said reflective layer and said heating element; and placing a flooring material on said layer of cement so that said flooring material is be embedded within said layer of cement.

\* \* \* \* \*